April 3, 1934.  L. HOLLAND-LETZ  1,953,354
AUTOMATIC TAKE-UP FOR ANTIFRICTION BEARINGS
Filed June 27, 1927   3 Sheets-Sheet 1
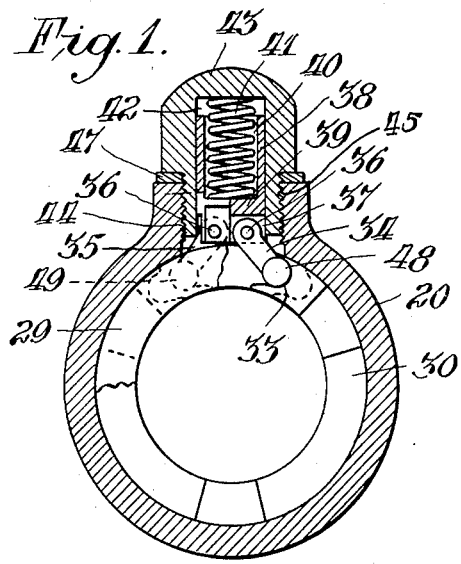
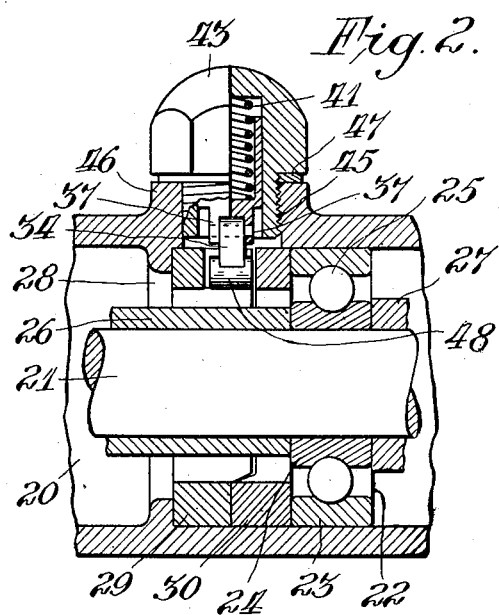
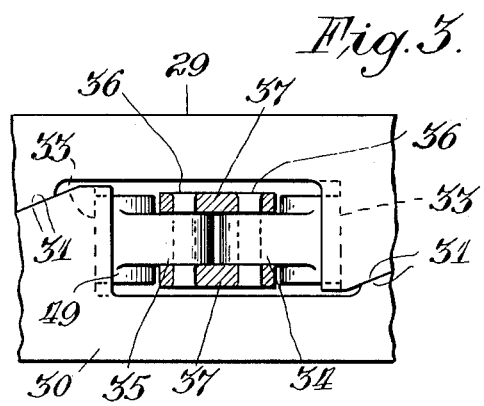
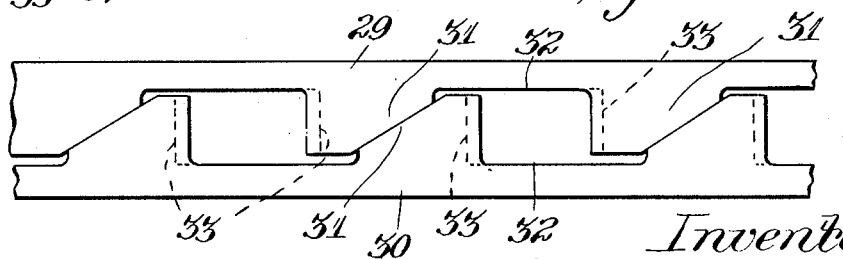
Inventor.
Ludwig Holland-Letz,
By John P. Smith
Atty.

April 3, 1934.  L. HOLLAND-LETZ  1,953,354
AUTOMATIC TAKE-UP FOR ANTIFRICTION BEARINGS
Filed June 27, 1927  3 Sheets-Sheet 2
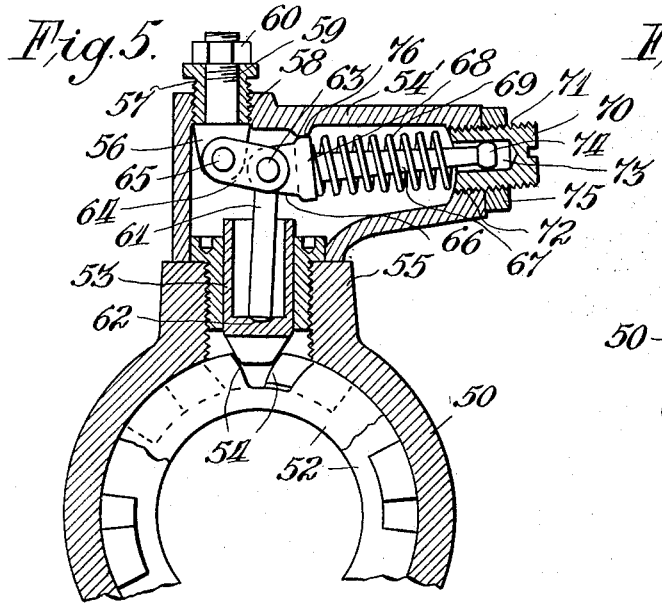
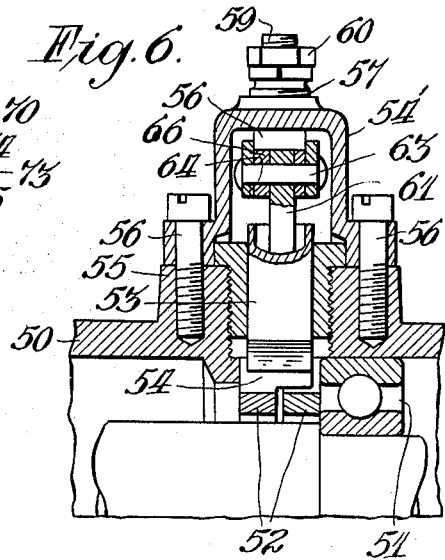
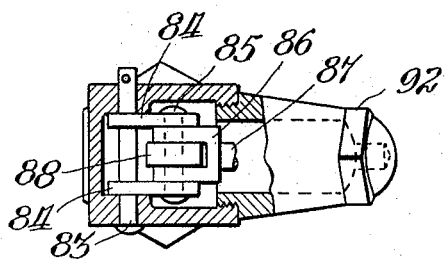
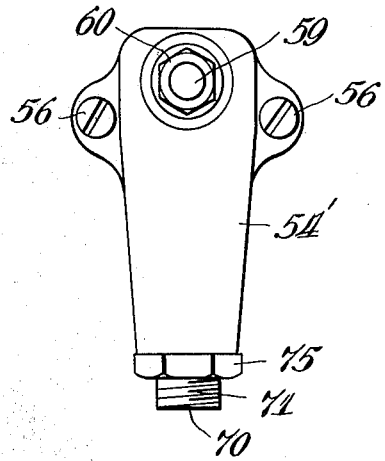
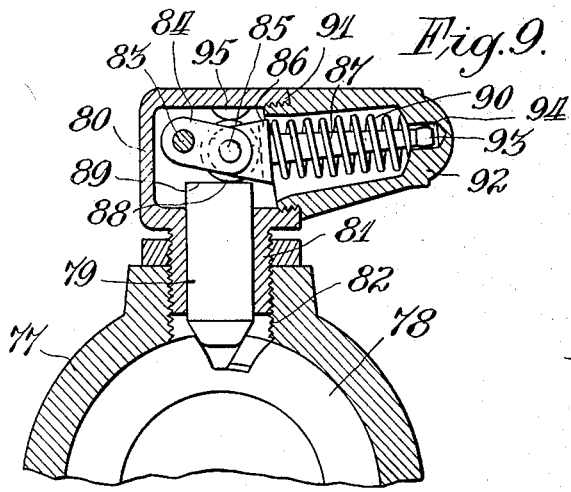
Inventor.
Ludwig Holland-Letz,
By John P. Smith
Atty.

April 3, 1934.  L. HOLLAND-LETZ  1,953,354
AUTOMATIC TAKE-UP FOR ANTIFRICTION BEARINGS
Filed June 27, 1927   3 Sheets-Sheet 3
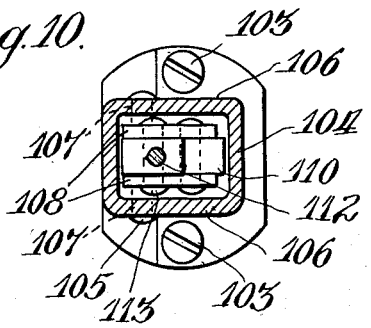
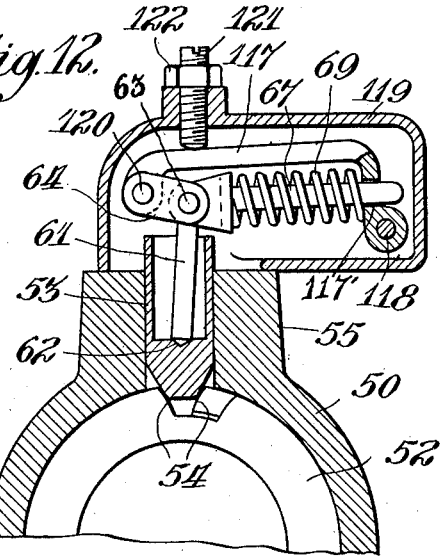
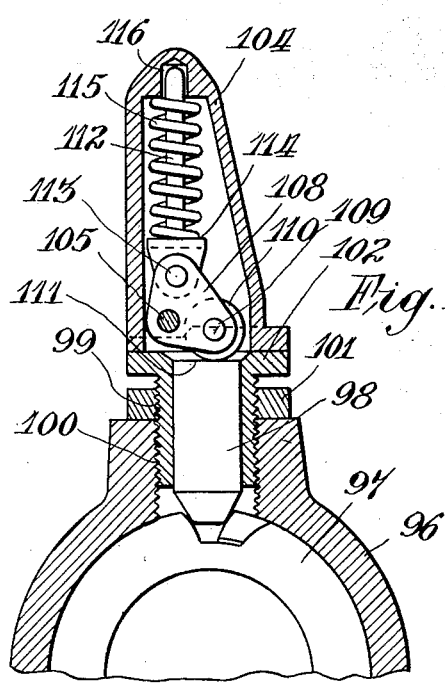
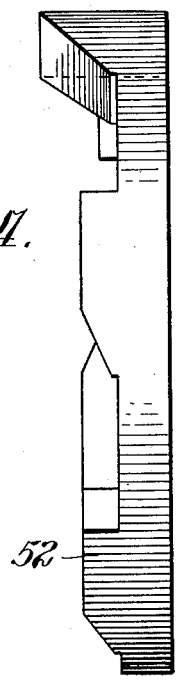
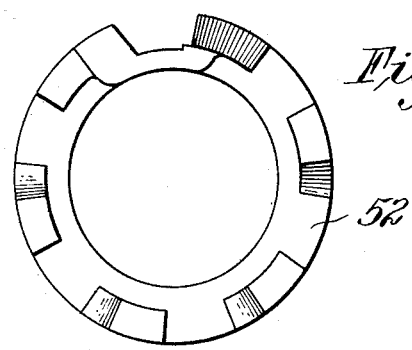
Inventor.
Ludwig Holland-Letz,
By John P. Smith
Atty.

Patented Apr. 3, 1934

1,953,354

UNITED STATES PATENT OFFICE 1,953,354

AUTOMATIC TAKE-UP FOR ANTIFRICTION BEARINGS

Ludwig Holland-Letz, Crown Point, Ind.

Application June 27, 1927, Serial No. 201,592

23 Claims. (Cl. 308—66)

This invention relates to an automatic take-up for anti-friction bearings.

One of the objects of the present invention provides a novel and improved form of an automatic take-up for anti-friction bearings which is so constructed and arranged for equalizing the spring pressure in such a manner as to convert a diminishing pressure into a constant and uniform one for automatically taking up the wear on anti-friction bearings as the wear ensues thereon.

A further object of the invention is to provide a novel and improved form of an automatic take-up for anti-friction bearings which is primarily intended for supplying an equalizing means for all types of bearings requiring greater amount of thrust pressure to sustain the radial load, particularly in such bearings as angular contact bearings, or also called combined radial and thrust bearings, or any other ball bearings capable of sustaining thrust loads in which the angle of contact of the ball is increased as wear continues.

A still further object of the invention is to provide a novel and improved equalizing construction of an automatic take-up for anti-friction bearings in which the initial effective pressure of the spring for actuating the links for taking up the wear, is almost zero and becomes increasingly greater as wear ensues.

A still further object of the invention is to provide a novel and improved equalizing construction, and one in which the equalizing ratio is easily adjusted without affecting the general assembly of bearing mounting.

These and other objects are accomplished by providing construction and an arrangement of the various parts in the manner hereinafter described and particularly pointed out in the appended claims.

Referring to the drawings:

Figure 1 is a cross sectional view of portions of a bearing with certain parts thereof broken away for the purpose of clearness, showing my invention embodied therein.

Figure 2 is a side elevational view of the same with certain portions shown in cross section.

Figure 3 is an enlarged fragmentary view of the camming rings showing the manner in which the toggle links are operatively mounted therein.

Figure 4 is a diagrammatic view of the peripheral surface of the camming rings.

Figures 5, 6 and 7 are transverse cross-sectional, longitudinal cross sectional and top plan views, respectively, of a modified form of equalizing mechanism for an automatic take-up for anti-friction bearings.

Figures 8 and 9 are fragmentary top plan, (partly in cross section) and side elevational views, (partly in cross section), respectively, of a second modification of an equalizing means for an automatic take-up for anti-friction bearings.

Figures 10 and 11 are top plan and side elevational views (partly in cross section), respectively, of a third modification of an equalizing means for automatically taking up the wear on anti-friction bearings.

Figure 12 is a cross sectional view of a fourth modification of an equalizing means for automatically taking up the wear on anti-friction bearings.

Figure 13 is a top plan view of one of the camming rings, and

Figure 14 is an enlarged side elevational view of the camming ring shown in Figure 13. As shown Figures 3 to 12 inclusive.

In illustrating my invention I have shown the preferred form of the same in Figures 1 to 4, inclusive, which is primarily intended for supplying an equalizing means for all types of anti-friction bearings requiring a more or less amount of thrust pressure to sustain the radial load, such as occurs in tapered roller bearings, angular contact ball bearings, annular ball bearings or any other bearing capable of sustaining a thrust load. The invention herein disclosed is an improvement on the form of the invention disclosed in my co-pending application, Serial Number 144,292, filed the 26th day of October, 1926.

The invention has particular reference to an automatic take-up for anti-friction bearing particularly of the ball bearing type, and contemplates the employment of a mechanism which will produce a constant or a rapidly increasing pressure or any variation therebetween on the anti-friction bearing in spite of the normal decrease in the pressure of the spring being used. The constant pressure type is especially adapted for certain forms of bearings. However, the principal feature of the present invention and the one which has particular adaptation for high speed abrasive internal grinder spindles where accuracy is of paramount importance is the mechanism which permits for example; an axial pressure on the anti-friction bearing to start at practically zero pounds and rapidly increase to approximately five hundred pounds, in a five ten-thousandth inch movement of one of the raceways of the anti-friction bearing.

In high speed grinder spindles the deep groove annular ball bearing is constructed so that the ball diameter fits the concave raceway groove just slightly free, in fact the fit is so close that if only a small amount is worn from the raceways in the vertical or radial direction from the axis of the spindle, the radial snugness is lost and the usefulness of the bearing is destroyed. In order to be able to continue the use of these worn bearings a pressure must be placed axially between two opposing bearings, but due to the close fit of the ball to the raceways the ball makes contact now on the side of the groove (not in the vertical or radial side) making a ball contact angle often as great as 45 degrees, which would mean that as much pressure must be placed axially to the opposing bearings as the radial load imposed in order to hold the shaft or spindle in its true axis. In other words, this type of bearing will require no axial pressure when first installed and may require a very heavy pressure after a slight wear has taken place. If this heavy pressure had been applied initially the bearing probably would have been destroyed instantly by the ball rupturing the raceways so that it would be of no further use.

The invention of the present instance is adapted for use in connection with a pair of complementary camming rings which are adapted to be revolved in opposite directions with respect to each other in position where one of the rings engages one of the bearing races and moves it with respect to the other race for taking up the wear as wear ensues on the anti-friction bearing. The principal feature of the present invention consists in the provision of the equalizing toggle link mechanism which includes two pivotally relating links which are under spring pressure and engageable with each of the operatively rotatable camming rings for automatically moving these rings in opposite directions for taking up the wear. These forms of links can replace the wedge plunger of the form described in my above mentioned co-pending application, and are efficient in certain types of anti-friction bearings.

For the purpose of illustrating the preferred form of my invention, I have shown a bearing supporting structure 20 which has rotatably mounted therein a shaft 21. The shaft 21 is journalled in the bearing structure 20 by means of an anti-friction member generally referred to by the reference character 22. This anti-friction bearing member comprises an outer bearing race 23, inner bearing race 24 and anti-friction bearing balls 25. The inner bearing race 24 is secured to the shaft in any well known manner, such as the usual spacer sleeves 26 and collars 27, the latter of which may either engage a shoulder on the shaft or some gear or operative part which may be geared to the shaft. The housing or bearing support 20 is provided with an inwardly extending annular flange 28. Mounted between the bearing race 23 and the annular flange 28 are two complementary cooperating camming rings 29 and 30. The camming rings 29 and 30 are provided with laterally projecting cooperating camming projections 31, having corresponding recess portions 32 therebetween. All of the camming projections 31 are provided with arcuate sockets, as shown at 33, for the purposes hereinafter set forth. It will be noted that by reason of the camming projections 31 on each of the camming rings 29 and 30, respectively, that as these rings revolve in opposite directions with respect to each other, one of the rings is moved laterally or axially of the shaft. This axial movement is transmitted to the outer anti-friction race 23, by reason of the camming ring 30, engaging the same so that as wear ensues on anti-friction bearing 22, the spring pressure automatically takes up the wear in the manner hereinafter described, and in a manner similar to the manner described in my co-pending application above referred to.

One of the essential features of the present invention is to provide an equalizing mechanism in the form of a toggle link connection which maintains a uniform thrust pressure on the bearing races or for producing a uniform increasing bearing pressure as wear ensues. This toggle link mechanism comprises two pivoted links 34 and 35, respectively, which have their upper ends pivotally connected by means of pins 36, to two depending flanges 37 formed on the lower end of the reciprocable sleeve 38. The sleeve 38 is provided with a transverse portion 39, which forms a cylindrical socket 40 in sleeve 38. Mounted in the cylindrical socket 40 is a pressure spring 41, which has one end thereof engaging the bottom of the socket 42, formed in a threaded cap 43. The cap 43 is provided with a threaded portion 44, adapted to engage a threaded bore 45, formed in the projection 46, in the bearing support 20. In order to secure the threaded cap 43 in position, I provide a lock washer 47. The lower ends of the links 34 are provided with cylindrical portions 48 and 49, which are adapted to be seated in the semi-circular recess 33, in each of the camming rings 29 and 30, respectively. From the above description, it will be seen that when the camming rings 29 and 30 are mounted between the flange 28 and anti-friction race 23 and the spring 41 under spring tension, that as the wear ensues on the anti-friction bearing, the links 34 will force the camming washers to rotate in opposite directions with respect to each other, and by reason of the camming projections on each of these rings, the outer race is forced axially with respect to the inner race, thereby taking up the wear as the wear ensues.

It will be noted that various lengths of springs such as 41 will govern the degree of pressure imposed upon the bearings, in other words, when the spring is compressed a distance equal to the toggle travel, then the pressure upon the wedge and bearing will be constant or practically so. On the other hand, when the amount of compression of the spring is such as to exceed the toggle travel an increased pressure will be exerted on the bearing as wear ensues.

In the first modification shown in Figures 5 to 7, inclusive, an equalizing mechanism is employed in the form of a toggle link connection in combination with the wedge form of plunger described and claim of my co-pending application above referred to. In this modified form, the structure shown therein is primarily adapted for use with the spring and cam wedge plunger and where the wear on the anti-friction ball bearing is to be equalized. This form is ideally adapted for this form of anti-friction bearing, in that it starts with practically no load, and increases as wear ensues on the ball and races, or in other words, where the angle of contact between the ball and the races is subject to increase angular change. An additional feature of this modified form is that it supplies the additional pressure which is required to overcome the difference of the diminishing effect of the spring on the cam wedge, so as to have substantially a constant pressure throughout the entire movement of the wedge. Another important feature of the form shown in this modification is that it is provided with two adjustments, one effecting relation of the linkage or toggle link mechanism and the other effecting the pressure of the spring.

The structure shown in the modified form in the Figures 5 to 7, inclusive, comprises the usual bearing support 50, anti-friction bearing 51, camming washers 52 and reciprocable wedge 53, which engages the bevelled surfaces 54 for effecting an axial adjustment of one of the races of the anti-friction bearing. The construction and operation of these parts may be similar to the device described in the forepart of the present specification, and is also described and claimed in my co-pending application above referred to, and for that reason it is believed that a detailed description of these parts is unnecessary. One of the essential features of the present modification of my invention comprises a somewhat L-shaped casing 54', which is adapted to be secured to the projecting portion 55 of the housing 50, by means of screws 56. The toggle link mechanism for actuating the wedge member 53 comprises an adjustable fulcrum 56, which is mounted in a threaded sleeve 57, which in turn is mounted in a threaded engagement with a bore 58 in the housing 54. The fulcrum 56 is provided with a threaded extension 59 and secured against movement within the sleeve by a nut 60. One of the toggle links, as shown at 61, engages a cupped shaped bore 62, formed in the base of the wedge member 53. The upper end of the link 61 is pivotally connected by means of a pin 63 to a pair of links 64. The other ends of the toggle links 64, are pivotally connected by means of a pin 65 to the fulcrum 56. Pivotally mounted on the pin 63, by means of a bifurcated portion 66, is a spring supporting link 67. The spring supporting link 67 is provided with an annular shoulder 68, against which rests a spring 69, having its other end thereof engaging adjustable thimble 70. The thimble 70 is provided with an exteriorly threaded portion, which engages the threaded bore 72 of the house 54. The thimble 70 is provided with a central cylindrical recess 73, in which the rounded end portion 74 of the link 67 is adapted to reciprocate therein. The thimble 70 is locked in position by a lock nut 75. The house 54 is provided with a lug, as shown at 76, which is adapted to engage the annular shoulder 68 for preventing the toggle link from passing over the center in a direction away from the wedge member 53.

From the above description, it will be readily seen that I have provided a novel and improved toggle link construction, by means of which the pressure of the wedge member may be maintained substantially constant, even though the pressure of the spring may be diminished by reason of the same being extended on account of the center 63 of the toggle link being moved downwardly from the fulcrum 65. It will also be noted that by providing the two adjustments, one for adjusting the fulcrum, and the other for adjusting the spring pressure, a very efficient equalizing means for maintaining pressure on the plunger wedge is provided.

In the modification shown in Figures 8 and 9, I have provided a novel toggle link, automatic take-up mechanism for anti-friction bearings, which is provided with one adjustment so as to effect the ratio of the linkage. This form is exceedingly compact and is capable of being knocked down for assembly in tight places by unscrewing the spring cup and removing the link and roller. In this modified form the usual bearing support 77, camming washers 78 and wedge plunger 79 are substantially in the form of those previously described. In this modified form I have provided a housing member 80, having threaded sleeve extension 81, adapted to be engaged by a threaded engagement with a bore 82 of the bearing support 77. Pivotally mounted in the housing 80, by means of a pin 83 are two links 84. Pivotally connected with the free end of the links 84, by means of a pin 85, to a bifurcated portion 86 is a spring link 87. Journaled on the pin 85, between the bifurcated portion 86, is a roller 88. The roller 88 is adapted to engage the top surface 89 of the wedge member 79. Mounted on the link 87 is a spring 90. Secured to the housing 80, by means of threaded engagement therewith, as shown at 91, is a thimble-like member 92, which encloses the spring 90 and link member 87. The free end of the link is provided with an enlarged rounded head 93, and is reciprocably mounted in a socket 94, formed in a thimble member 92. It will readily be seen that a threaded sleeve may be mounted on the end of this thimble, so that an adjustment may be made for varying the effective pressure of the spring with a corresponding pressure imposed upon the bearings. The upper side of the housing member 80 is provided with an inwardly projecting lug 95, which is adapted to engage the roller 88, for preventing the toggle link from passing over center in a direction opposite and away from the wedge member 79. From the above description, it will be seen that as wear ensues on the anti-friction bearing, one of the races is moved axially with respect to the other by the action of the camming rings, which in turn are actuated to revolve in opposite directions by the wedge member 79. The wedge member in turn is forced downwardly, by reason of the toggle links 84, and spring link member 87 by the action of the spring 90. In this construction the spring maintains substantially a constant pressure on the wedge member, by reason of the changing of the position of the pivot of the toggle mechanism.

The form shown in Figs. 8 and 9 is a construction in which the spring pressure is more or less set. This arrangement is expressly suited to any type of bearing automatic take-up but each different type of service may use a different length of spring and longer cup while another may use a shorter link for the one, as shown at 84, or a much stiffer spring, etc. It will be noted that the raising or lowering of the sleeve or thimble 81 increases or removes respectively the bearing play when the assembly is initially built so that when the same is so assembled the roller 88 may be adjusted to rest against the stop 95 which is the minimum pre-determined starting load for an annular ball bearing. Should this load be insufficient, then by raising the housing 80 the required pressure may be secured, after which the same may be locked in position. It will be noted that by raising the housing 80, the roller 88 drops from the stop 95. At the same time the link and wedge member also drop so that the spring is more effective. Consequently there will be more bearing pressure at the initial starting point. Figs. 8, 9, 10 and 11 are a cheaper and more fool-proof design than the construction shown in Figs. 5 and 6. However, all the designs in this application are capable, by simple modifications, to automatically take-up play for practically any type of bearing mentioned in this application.

The modification of my invention, shown in

Figs. 10 and 11, is similar in function to the form shown in Figs. 8 and 9, and is of a vertical construction, which permits its adaptation for use in places where the space prevents the use of the other forms.

In the modified form shown in Figs. 10 and 11, the usual bearing support 96, camming rings 97 and reciprocal wedge member 98 are employed, similar in construction and function to those shown in the other forms. In this form, the wedge member 98 is reciprocally mounted in a threaded sleeve 99, which is mounted in threaded engagement with a threaded bore 100, formed in the bearing support 96. The sleeve 99 is locked against displacement by a nut 101, which is in threaded engagement with the threaded sleeve 99. Formed integrally with the sleeve 99 is a flange 102, to which is secured, by means of screws 103, a vertically extending casing or housing 104. Pivotally mounted on a pin 105, secured in aligned suitable bores 107, formed in the housing 106, are two bell crank members 108. Journaled on a pin 109, secured to the free end of the bell crank members 108, is a roller 110. The roller 110 is adapted to engage the upper surface 111 of the wedge member 98, as clearly shown in Fig. 11. The other ends of the bell crank members 108 are pivotally connected to a link 112, by means of a pin 113. This link 112, together with the bell crank members 108, forms substantially a toggle link connection for actuating the wedge member 98. Mounted between a shoulder 114, formed on the link 112, and the upper end of the housing 104, is a spring 115, which normally actuates the bell crank members about their pivot 105, for forcing the wedge member inwardly toward the axial center of the shaft. This movement of the wedge member actuates the camming rings 97, in a manner previously described for automatically taking up the wear of the anti-friction bearing as wear ensues. The upper end of the link 112 is loosely mounted in a cylindrical socket 116 formed in the upper end of housing 104.

The modified form shown in Fig. 12 is similar in construction to that shown in Figs. 5 to 7, inclusive, and the parts which are identical in these two forms have been given the same reference characters because their function and operation are identical. In this form, (Fig. 12), the toggle link mechanism, which includes the links 64 and 67, is mounted in an adjustable frame 117, which has one end thereof pivotally mounted on a pin 118. The pin 118 is secured in the housing 119 in any well known manner which completely encloses the movable parts of the take-up. Adjacent to the pivot 118, of the frame 117, is an aperture 117', which reciprocally receives one end of the link 67. One end of the link 64 is pivotally connected by means of a pin 120, to the free end of the frame member 117. The frame member 117, which carries the toggle links, is adjustable to and from the wedge member 53 by a threaded bolt 121, which is in threaded engagement with the housing, and has one end thereof engageable with the frame 117. The bolt 121 is locked in various positions of adjustment by a lock nut 122. From the above description, it will be seen that by adjusting the bolt 121, the frame 117 may be adjusted about its pivot 118 for properly positioning the toggle link mechanism with respect to the wedge member 53, so that the proper starting position is established in which all the bearing play is removed, or a slight initial spring pressure placed on the wedge member.

From the above description of my new and improved form of equalizing means for automatically taking up the wear on anti-friction bearings, it will be noted that the same is not only adaptable to a variety of anti-friction bearings, but is also adaptable to bearings where the space is limited for the use of such a device.

Obviously from the above description it will be seen that in all the forms of my invention, that the diminishing pressure of the spring as it becomes extended, exerts a different pressure on the plunger and the camming washers. In other words, the diminishing pressure exerted by the spring is converted into a constant or non-diminishing pressure or an increased pressure on the plunger and camming rings.

It will, of course, be readily understood that the various modifications herein shown and described may be easily changed to a manually controlled device by substituting a screw for the spring in each instance.

While in the above specification I have described one preferred form of my invention, together with several modifications thereof, it will, of course, be understood that other modifications may be made without departing from the spirit and scope of the invention, as expressed in the following claims.

What I claim as my invention and desire to secure by Letters Patent is:

1. A device for taking up the wear on an anti-friction bearing comprising a support, a shaft mounted in said support, an anti-friction bearing rotatably supporting said shaft, camming expanding rings mounted in said support and engageable with said anti-friction bearing, and a spring actuated toggle link connection associated with said camming rings for causing said camming rings to expand for automatically taking up the wear on said anti-friction bearing as wear ensues.

2. A device for taking up the wear on an anti-friction bearing comprising a support, a shaft mounted in said support, an anti-friction bearing mounted between said support and said shaft, and a spring actuated equalizing toggle link mechanism mounted in said support and operatively related to said anti-friction bearing for taking up the wear on said anti-friction bearing as wear ensues.

3. A device for taking up the wear on an anti-friction bearing comprising a support having a shaft mounted therein, an anti-friction bearing for said shaft, camming rings mounted in said support and operatively related to said anti-friction bearing, and a spring actuated toggle link mechanism mounted in said support and operatively connected with said camming rings for automatically taking up the wear on said anti-friction bearing as wear ensues.

4. A device for taking up the wear on an anti-friction bearing comprising a support having a shaft mounted therein, an anti-friction bearing for said shaft including a plurality of bearing races and anti-friction bearing members, a plurality of co-acting camming rings mounted in said support and operatively related to one of said races, and a spring actuated toggle link mechanism for equalizing the pressure on said camming rings for taking up the wear automatically on said anti-friction bearing as wear ensues.

5. A device for taking up the wear on an anti-friction bearing comprising a support having a shaft mounted therein, an anti-friction bearing for said shaft including a plurality of races and a plurality of anti-friction bearing members, a plurality of camming rings rotatable in opposite directions surrounding said shaft and having one thereof engageable with one of said races, and a spring actuated toggle link mechanism carried by said support and engageable with each of said camming rings for automatically rotating said camming rings in opposite directions for taking up the wear on said anti-friction bearing as wear ensues.

6. A device for taking up the wear on an anti-friction bearing comprising a support having a shaft mounted therein, an anti-friction bearing for said shaft including a plurality of races and a plurality of anti-friction bearing members, a plurality of camming rings rotatable in opposite directions surrounding said shaft and having one thereof engageable with one of said races, and spring actuated equalizing link connections mounted on said support and operatively related to said camming rings for automatically rotating said camming rings in opposite directions for taking up the wear on said anti-friction bearing as wear ensues.

7. A device for taking up the wear on an anti-friction bearing comprising a support having a shaft mounted therein, an anti-friction bearing for said shaft including a plurality of races and a plurality of anti-friction bearing members, a plurality of camming rings rotatable in opposite directions and having one end thereof engageable with one of said races, and spring actuated pivoted link connections mounted on said support and operatively related to said camming rings for rotating said camming rings in opposite directions for taking up the wear on said anti-friction bearing as wear ensues.

8. A device for taking up the wear on an anti-friction bearing comprising a support having a shaft mounted therein, an anti-friction bearing for said shaft including a plurality of races and a plurality of anti-friction bearing members, a plurality of camming rings surrounding said shaft and having one thereof engageable with one of said races, a spring mounted on said support, and means actuated by said spring and engageable with said camming rings for actuating said rings for exerting a constantly unvarying pressure on said rings as the pressure of said spring diminishes.

9. A device for taking up the wear on an anti-friction bearing comprising a support having a shaft mounted therein, an anti-friction bearing for said shaft, a plurality of camming rings rotatable in opposite directions surrounding said shaft and having one thereof engageable with said anti-friction bearing, and a spring actuated toggle link mechanism carried by said support for maintaining substantially a constant pressure on said camming rings and for automatically taking up the wear on said anti-friction bearing as wear ensues.

10. A device for taking up the wear on an anti-friction bearing comprising a support having a shaft mounted therein, an anti-friction bearing for said shaft including a plurality of races and a plurality of anti-friction bearing members, a plurality of camming rings rotatable in opposite directions surrounding said shaft and having one thereof engageable with one of said races, and a plurality of spring actuated normally divergent links operatively related to said camming rings for maintaining a substantially constant pressure on said rings and for automatically taking up the wear on said anti-friction bearing as wear ensues.

11. A device for taking up the wear on an anti-friction bearing comprising a support having a shaft mounted therein, an anti-friction bearing for said shaft including a plurality of races and a plurality of anti-friction bearing members, a plurality of camming rings rotatable in opposite directions surrounding said shaft and having one thereof engageable with one of said races, a reciprocal sleeve mounted in said support, a spring mounted in said sleeve for normally pressing the same toward said shaft, and a plurality of links pivotally connected with said sleeve and engageable with each of said camming rings for rotating said rings in opposite directions whereby said rings force one of said races axially for automatically taking up the wear on said anti-friction bearing.

12. A device for taking up the wear on an anti-friction bearing comprising a support having a shaft mounted therein, an anti-friction bearing for said shaft including a plurality of races and a plurality of anti-friction members, a plurality of oppositely rotatable camming members mounted in said support and operatively related to one of said races, a threaded cap secured in a threaded bore formed in said first named bearing, a reciprocal sleeve mounted in said cap, a spring mounted in said sleeve for normally forcing said sleeve toward said shaft, and a plurality of equalizing links pivoted to said sleeve and engageable with said camming rings for normally rotating said rings in opposite directions for automatically taking up the wear on said anti-friction bearing.

13. A device for taking up the wear on an anti-friction bearing comprising a support having a shaft mounted therein, an anti-friction bearing for said shaft including a plurality of races and a plurality of anti-friction members, a plurality of operatively related camming rings mounted in said bearing, a threaded cap secured in a threaded bore formed in said support, a reciprocal sleeve mounted in said cap, a spring mounted in said sleeve for normally forcing said sleeve toward said shaft, and a plurality of equalizing links pivoted to said sleeve and having their free ends engageable in sockets formed in said camming rings for rotating said rings in opposite directions for taking up the wear on said anti-friction bearing as wear ensues.

14. A device for taking up the wear on an anti-friction bearing comprising a support, a shaft mounted in said support, means mounted in said support and engageable with said anti-friction bearing for urging said anti-friction bearing in one direction, a spring mounted in said support, and means actuated by said spring and operatively related to said first named means for exerting a uniformly increasing axial pressure on said first named means as the pressure exerted by said spring uniformly decreases.

15. A device for taking up the wear on an anti-friction bearing comprising a support, a shaft mounted in said support, means mounted in said support and engageable with said anti-friction bearing for urging said anti-friction bearing in one direction, a spring mounted in said support, and means mounted between said spring and said first named means for converting the diminishing spring pressure into an increasing pressure for actuating said first named means.

16. A device for taking up the wear on an anti-friction bearing comprising a support, a shaft mounted in said support, means mounted in said support and engageable with said anti-friction bearing for urging said anti-friction bearing in one direction, a spring mounted in said support, and means mounted between said spring and said first named means for converting the diminishing pressure of said spring into an increasing axial pressure on said first named means.

17. A device for taking up the wear on an anti-friction bearing comprising a support, a shaft mounted in said support, means mounted in said support and engageable with said anti-friction bearing for urging said anti-friction bearing in one direction, a spring mounted in said support, and pivoted means carried by said support and mounted between said spring and said first named means for converting the diminishing pressure of said spring into an increasing axial pressure on said first named means.

18. A device for taking up the wear on an anti-friction bearing comprising a support, a shaft mounted in said support, means mounted in said support and engageable with said anti-friction bearing for urging said anti-friction bearing in one direction, a spring mounted in said support, and a plurality of pivoted links carried by said support and mounted between said spring and said first named means for converting the diminishing pressure of said spring into an increasing pressure on said first named means.

19. A device for taking up the wear on an anti-friction bearing comprising a support a shaft mounted in said support, movable means mounted in said support and engageable with said anti-friction bearing, a spring mounted in said support exerting a diminishing pressure as the same becomes extended, and means engageable with said first named means and actuated by said spring for urging a non-diminishing pressure on said first named means as the pressure of said spring diminishes.

20. A device for taking up the wear on an anti-friction bearing comprising a support, a shaft, an anti-friction bearing mounted in said support, oppositely rotatable means mounted in said support and engageable with said anti-friction bearing, a spring mounted in said support, and a pressure transmitting means actuated by said spring and engageable with said rotatable means for urging a different pressure on said rotatable means than the pressure urged by said spring.

21. A device for taking up the wear on an anti-friction bearing comprising a support, a shaft, an anti-friction bearing mounted in said support, rotatable means mounted in said support and engageable with said anti-friction bearing, a spring mounted in said support exerting a diminishing pressure as the same becomes extended, and means mounted between said spring and said rotatable means for converting the diminishing pressure exerted by said spring into a non-diminishing pressure on said rotatable means.

22. A device for taking up the wear on an anti-friction bearing comprising a support, a shaft mounted in said support, means mounted in said support and engageable with said anti-friction bearing for urging said anti-friction bearing in one direction, a spring mounted in said support exerting a diminishing pressure as the same becomes extended, and means mounted between said spring and said first named means for converting the diminishing pressure of said spring into a constantly unvarying pressure on said anti-friction bearing.

23. A device for taking up the wear on an anti-friction bearing comprising a support, a shaft, an anti-friction bearing mounted on said support, expanding means mounted in said support and engageable with said anti-friction bearing, a spring mounted in said support exerting diminishing pressure as the same becomes extended, and means actuated by said spring for exerting a non-diminishing pressure on said expanding means for automatically taking up the wear on said anti-friction bearings as wear ensues.

LUDWIG HOLLAND-LETZ.